(12) United States Patent
Essenter

(10) Patent No.: US 7,265,255 B2
(45) Date of Patent: Sep. 4, 2007

(54) SOIL DECONTAMINATION METHOD AND APPARATUS FOR RIVER BOTTOMS

(75) Inventor: Joseph Essenter, 69 Lexington Ave., Troy, NY (US) 12180

(73) Assignee: Joseph Essenter, Troy, NY (US)

( * ) Notice: Subject to any disclaimer, the term of this patent is extended or adjusted under 35 U.S.C. 154(b) by 699 days.

(21) Appl. No.: 10/383,747

(22) Filed: Mar. 10, 2003

(65) Prior Publication Data
US 2004/0181112 A1 Sep. 16, 2004

(51) Int. Cl.
*A62D 3/00* (2006.01)
(52) U.S. Cl. .................. 588/406; 588/306; 588/900
(58) Field of Classification Search ............ 588/306, 588/309, 301, 404, 406, 405, 250, 261, 900; 405/128.15, 128.45, 129.2, 129.1, 129.27, 405/129.6, 129.65, 303; 210/739, 747, 748, 210/542, 157.61; 219/121.6, 121.61, 121.85; 204/157.15
See application file for complete search history.

(56) References Cited
U.S. PATENT DOCUMENTS

| | | | | |
|---|---|---|---|---|
| 4,134,831 A | * | 1/1979 | Dawson et al. | 208/262.5 |
| 4,463,691 A | * | 8/1984 | Meenan et al. | 110/346 |
| 5,126,020 A | * | 6/1992 | Dames | 588/306 |
| 5,524,545 A | * | 6/1996 | Miller et al. | 102/293 |
| 6,276,871 B1 | * | 8/2001 | Bruso | 405/128.5 |
| 6,908,559 B2 | * | 6/2005 | Collings | 210/668 |

* cited by examiner

*Primary Examiner*—Edward M. Johnson

(57) ABSTRACT

A system and apparatus is provided for the decontamination of river bottoms. The system makes use of a barge, which is passed over the soil that needs to be decontaminated. The barge carries a high intensity laser, such as a 2,000 kW excimer YAG laser. The output of the laser is directed into a plurality of fiber optic cables. These fiber optic cables extend from the laser all the way down to the bottom of the river. The fiber optic cables direct the high intensity laser beams at the bottom of the river. The laser light reacts with the PCBs in the soil and breaks down and dissociates the chemicals into harmless by-products. Additionally, UV light emitters can also be attached to the fiber optic cables, near the river bottom, to assist in the PCB decontamination process.

6 Claims, 4 Drawing Sheets

Structure of Polychlorinated Biphenyl (PCB) Molecule monochlorobiphenyl = 1 chlorine atom per molecule
dichlorobiphenyl = 2 chlorine atoms per molecule
trichlorobiphenyl = 3 chlorine atoms per molecule
tetrachlorobiphenyl = 4 chlorine atoms per molecule
pentachlorobiphenyl = 5 chlorine atoms per molecule
hexachlorobiphenyl = 6 chlorine atoms per molecule
heptachlorobiphenyl = 7 chlorine atoms per molecule
octachlorobiphenyl = 8 chlorine atoms per molecule
nonachlorobiphenyl = 9 chlorine atoms per molecule
decachlorobiphenyl = 10 chlorine atoms per molecule

Fig. 1

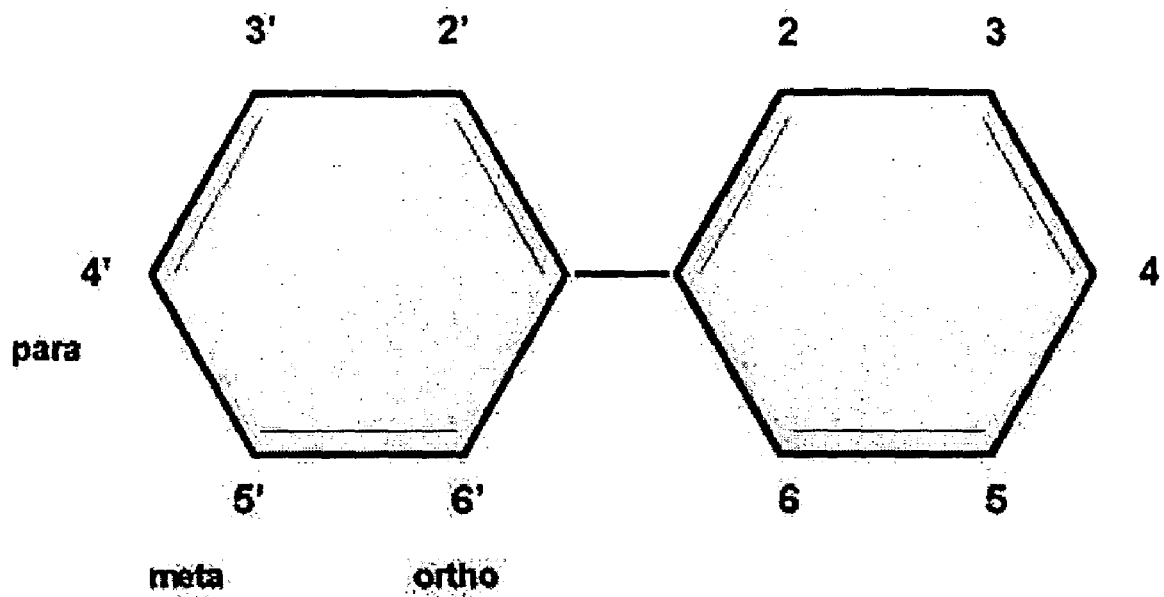

Structure of Polychlorinated Biphenyl (PCB) Molecule monochlorobiphenyl = 1 chlorine atom per molecule
dichlorobiphenyl = 2 chlorine atoms per molecule
trichlorobiphenyl = 3 chlorine atoms per molecule
tetrachlorobiphenyl = 4 chlorine atoms per molecule
pentachlorobiphenyl = 5 chlorine atoms per molecule
hexachlorobiphenyl = 6 chlorine atoms per molecule
heptachlorobiphenyl = 7 chlorine atoms per molecule
octachlorobiphenyl = 8 chlorine atoms per molecule
nonachlorobiphenyl = 9 chlorine atoms per molecule
decachlorobiphenyl = 10 chlorine atoms per molecule

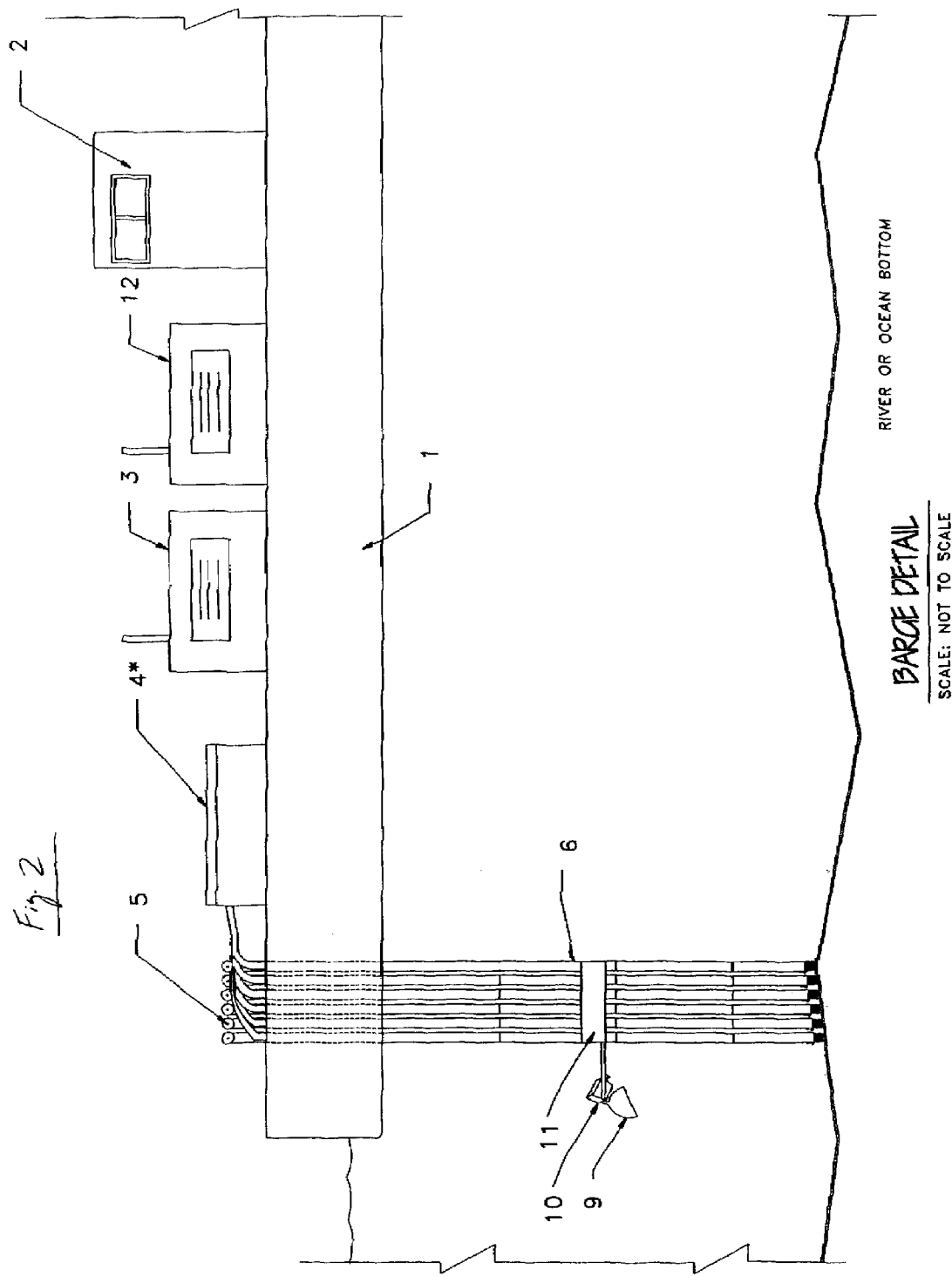

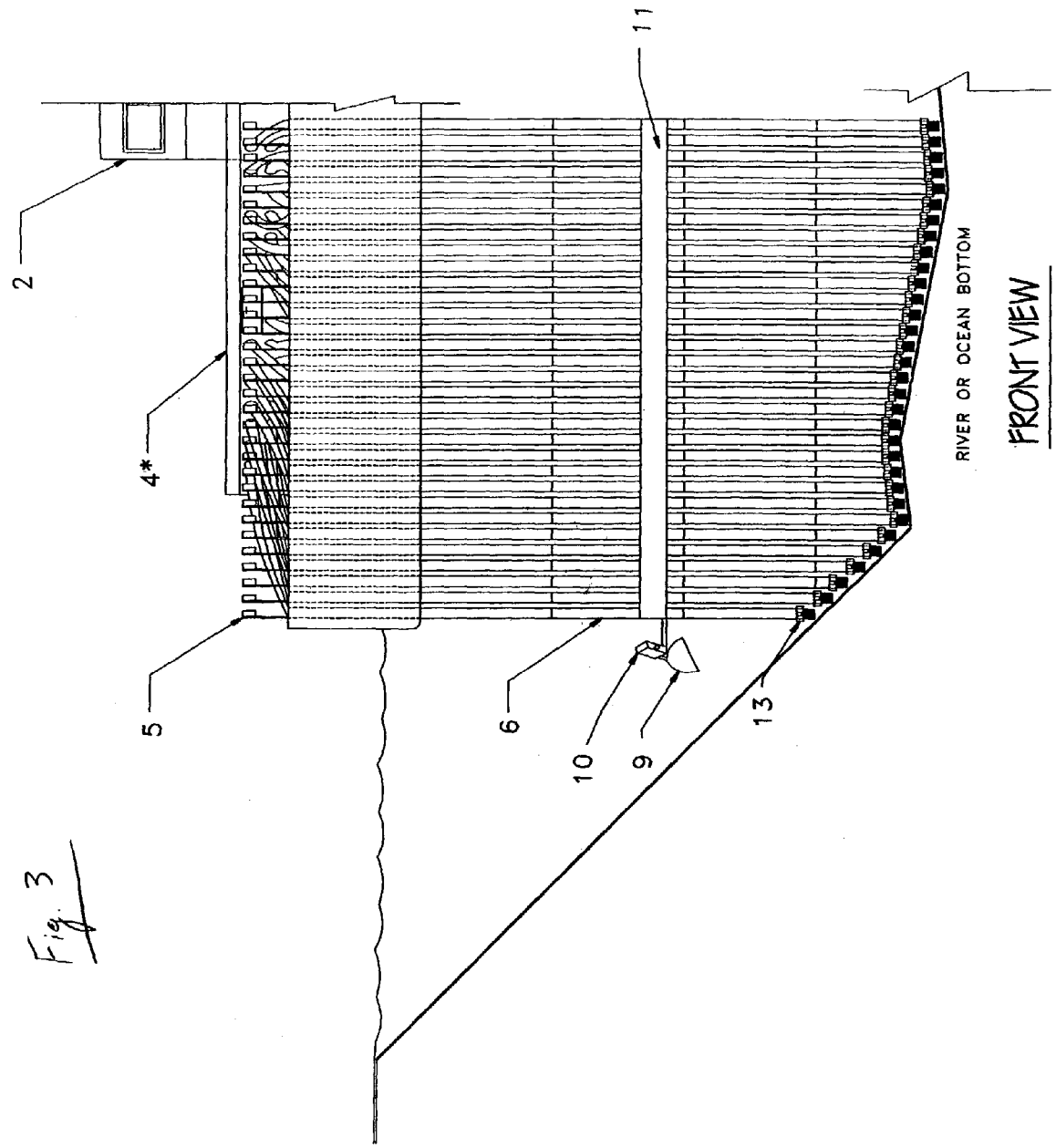

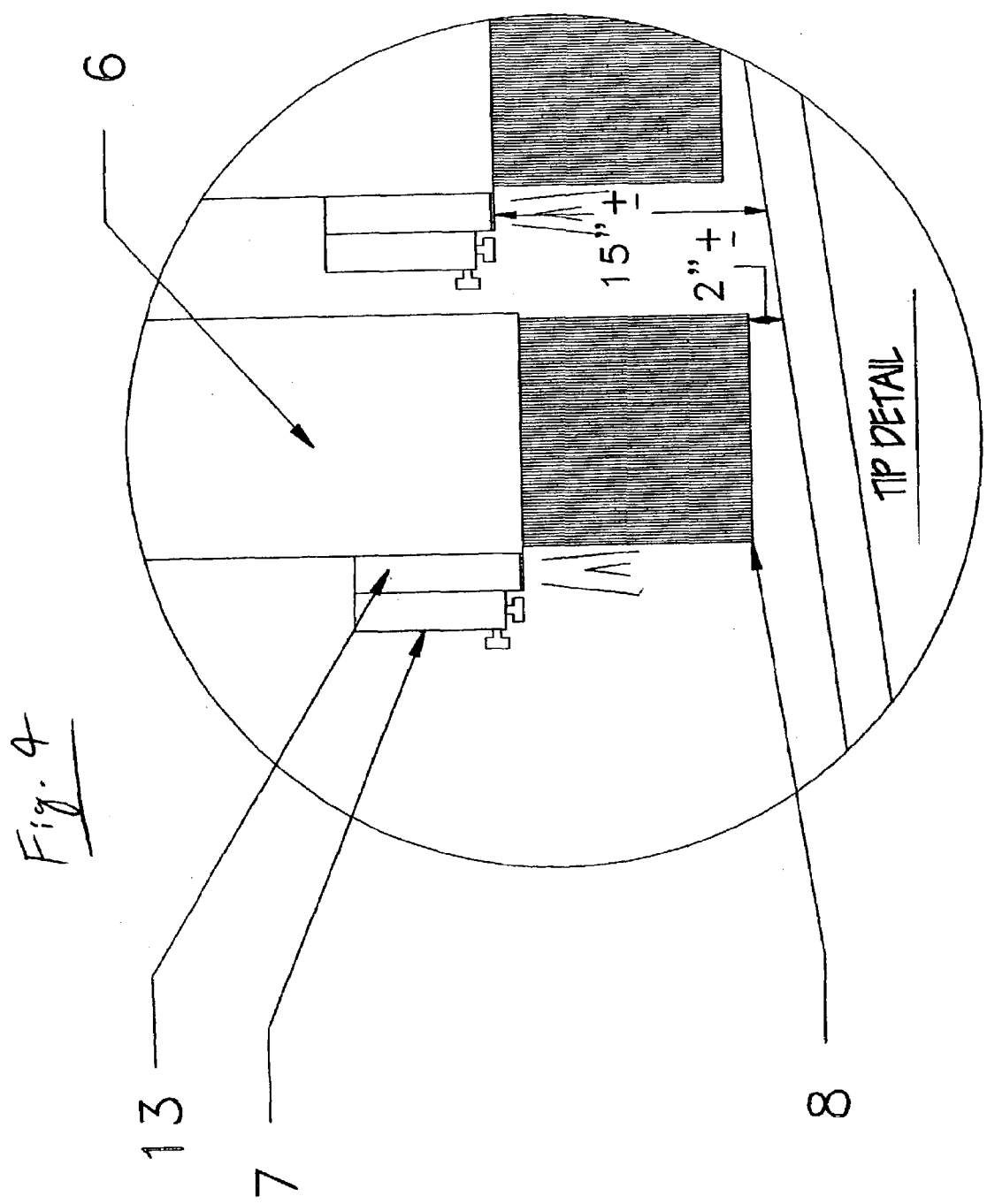

SOIL DECONTAMINATION METHOD AND APPARATUS FOR RIVER BOTTOMS

BACKGROUND OF THE INVENTION

1. Field of the Invention

The present invention relates to the field of soil decontamination. Particularly, the present invention relates to a method and apparatus for the decontamination of soil located at the bottom of lakes, rivers, streams, ponds or any other type of body of water.

2. Description of the Background Art

In many of the lake and river bottoms throughout the U.S. the presence of various toxic chemicals is a well known fact. PCB's are some of the worst chemicals present. PCBs or polychlorinated biphenyls are a group of chemicals consisting of 209 individual compounds. PCBs were widely used as a fire preventive and insulator in the manufacture of transformers and capacitors because of their ability to withstand exceptionally high temperatures. PCBs were banned by the EPA in 1979, and are classified as a probable human carcinogen by numerous national and international health-protective organizations, such as the EPA, The Agency for Toxic Substances and Disease Registry (an arm of the U.S Public Health Service) and the World Health Organization. Research also links PCB exposure to developmental problems. PCBs build up (bioaccumulate) in the environment, increasing in concentration as you move up the food chain. This is of special concern in areas where fish are exposed to PCB contamination and may be consumed by humans (as in the Hudson River in New York State). There are 209 varieties of PCBs, known individually as congeners. A congener may have between 1 and 10 chlorine atoms, which may be located at various positions on the PCB molecule (see FIG. 1).

The risk posed to human health and the environment by PCB contamination has driven the search for cost effective remedial technologies. The Code of Federal Regulations (CFR) addresses PCB treatment/disposal methodologies in 40 CFR 761.65. The CFR requires non-liquids (e.g., soils, rags or other debris) with a PCB concentration greater than 50 ppm be incinerated or sent to a chemical waste landfill. Similarly, liquids (other than mineral oil) with PCB concentrations between 50 and 500 ppm are to be disposed of in a chemical waste landfill or treated in an incinerator or high efficiency boiler. The relatively high costs associated with these disposal options have driven the development of other methods to lower PCB levels in contaminated materials.

A number of physical processes have been proposed for the remediation of PCB contaminated soils. The following paragraphs provide brief discussions about the treatment of PCBs with incineration, in-situ vitrification, solvent extraction, stabilization, and base catalyzed decomposition.

Incineration. The Toxic Substances Control Act (TSCA) requires that 99.9999% of PCBs be destroyed if incineration is to be used for PCB remediation. To achieve this destruction and removal efficiency, the incinerator must operate at a high temperature (>1000° F.) and be capable of holding the PCB contaminated waste for long residence times. There are fewer than 10 TSCA permitted PCB incinerators in the USA. Some of these incinerators are mobile and can be brought to the waste site without additional TSCA permitting, but air discharge and other permits may still be required depending on the location and type of waste. This is a conventional but expensive technology for PCB remediation.

In-situ vitrification (ISV) is an emerging remedial technology that does not destroy the contaminants, but rather uses electrical current to melt contaminated soils in situ, thus immobilizing any contaminants not volatilized by the heat of the process. Off-gases must be treated for organic contaminants. The volume of contaminated waste is reduced 20-40% by the ISV process since pore spaces in the soil are eliminated. The resulting vitrified material may be left in place and covered with clean fill or soil. Treatability tests are required before using this technology for PCB contaminated soils because the process may not provide adequate immobilization in all cases. Currently there is only 1 vendor of this technology, and the cost is similar to incineration.

Solvent extraction (SE) is another non-destructive method of PCB remediation. The process makes use of the preferential solubility of PCBs in oily solvents to concentrate the contaminants in a single phase. One study achieved a 98% removal of approximately 20 ppm of PCB contamination in oily soils. The cost of this process is very site and waste specific. Once the PCBs are concentrated in the solvent stream, they must still be destroyed by incineration or disposed in a proper manner. Solvent extraction is an emerging technology.

Stabilization is another non-destructive, emerging technology for PCB remediation. In this process, the PCB contaminated soil is excavated and mixed with amendments and binders that immobilize PCBs within the matrix. Volume increases of up to 120% have been reported. The stabilized waste is then landfilled. The procedure costs approximately $500 per ton to stabilize the waste. Landfill costs are additional. At least one vendor has experienced significant leaching from stabilized waste matrices, raising concerns about the effectiveness of the stabilization process.

Base catalyzed decomposition (BCD) is a somewhat complicated two-stage process that had been proposed for the treatment of PCB contaminated soils and sediments. In the first stage contaminated materials are mixed with $NaHCO_3$ and heated to 340° C. Vapors resulting from this treatment are condensed, separated and treated with either carbon adsorption or continue on to the second stage of the process. In Stage 2, the condensate is heated to 340° C. and mixed with a hydrogen donor oil, NaOH, and a catalyst. Each stage of the process requires the treatment of off-gas and the disposal of treated soils and residues, thus raising the overall cost of the effort considerably. Although greater than 97% reductions in the PCB mass concentration have been reported after first stage treatment, treated materials still require disposal. In addition, little is known about the PCB removal mechanisms, leading to questions about the formation of toxic by-products.

In addition to physical treatment processes, a number of studies have been performed to evaluate the effectiveness of biological treatment methodologies on PCB contaminated materials. In general, researchers have attempted to stimulate microbially catalyzed PCB-degrading activity through nutrient addition, genetic engineering, bioaugmentation, cometabolite addition (e.g., adding biphenyl), and microbial enrichments. Other methods for improving biological PCB destruction include using any of several physical, chemical or biological methods (e.g., surfactants) to increase PCB bioavailability. In general, a wide variety of biological treatment processes have been investigated, each with various advantages and disadvantages, but no one treatment offers a clearly superior solution to the PCB problem. Initially, researchers focused on the ability of aerobic microorganisms to metabolize PCBs. It soon became clear that most aerobic microorganisms were limited to the metabo lism of PCBs with fewer than 4 chlorine substituents. The discovery of weathered Aroclor 1242 in Hudson River sediments suggested that the more highly chlorinated PCBs were susceptible to reductive dechlorination by anaerobic microorganisms. Following this discovery, the ability of anaerobic microorganisms to degrade PCBs was investigated. Although it was found that anaerobic microorganisms could indeed reduce the number of chlorine substituents from highly chlorinated PCBs they were unable to completely degrade PCB mixtures. Researchers then examined the effectiveness of using anaerobic and aerobic biodegradation in sequence. These approaches are discussed in the following paragraphs.

In general, aerobic biodegradation of PCBs is limited to the congeners containing fewer than 4 chlorine atoms, but a few strains of aerobic bacteria have demonstrated the ability to degrade tetra-, penta-, and hexa-chlorobiphenyls. Because the majority of congeners in Aroclors 1221, 1232, 1016 and 1242 contain fewer than 4 chlorine atoms, it is possible to demonstrate significant levels of PCB mass removal with aerobic biodegradation. In fact, mass reductions between 50 and 85% have been commonly reported in materials contaminated with up to 1,000 ppm of Aroclors 1221 through 1248. One recent study showed a 67% drop in the molar concentration of weathered Aroclor 1248 from soil slurry microcosms with a low organic carbon content. The main disadvantage of aerobic PCB biodegradation is its inability to breakdown the more highly chlorinated and more highly toxic congeners. Consequently, the overall reduction in risk to human health and the environment may not be as significant as the overall PCB mass removal. Aerobic bacteria attack less chlorinated PCBs via aerobic oxidative processes, predominately by the enzymatic 2,3-dioxygenase pathway, followed by oxidation through a second dioxygenase and ring cleavage. This pathway leads to the production of chlorobenzoic acid intermediates that can build-up and inhibit pure cultures of PCB degrading organisms, but are readily hydrolyzed by other aerobic bacteria in diverse microbial communities. In addition to the bioremediation of PCBs with aerobic bacteria, the ability of various species of white rot fungi to biodegrade PCBs has also been investigated. These fungi are the primary degraders of lignin, a non-repetitive polymer consisting of numerous substructures of which the biphenyl group is included. In nature, these organisms secrete a series of peroxidase type enzymes that break up the lignin in wood to free up cellulose that the fungi use for energy and growth. These enzymes are produced in response to nutrient stresses such as carbon and nitrogen limitation, and they have been implicated in the breakdown of environmental contaminants including PCBs. One of the primary differences between bacterial and fungal degradation of PCBs is that the fungi tend to degrade a wider range of PCB congeners than do bacteria. *Phanaerochaete chrysosporium*, the most commonly studied species of white rot fungi, has been shown capable of degrading a wide range of Aroclors from 1242 to 1260. Like aerobic bacteria, the rate and extent of degradation is inversely proportional to the chlorine content, with little metabolism of the tetrachlorinated and/or hexachlorinated congeners. Other species including *Trametes versicolor* and *Pleurotus ostreatus* were very effective at degrading these congeners. Although white rot fungi have been shown to be capable of degrading PCBs in flask studies, there has been limited success applying these organisms in engineered applications for soil remediation. White rot fungi grow naturally on decaying wood, not in soil, and treatment of contaminated soil requires development of an inoculum consisting of the organism and a suitable growth support (i.e. wood or some cellulose based matrix). The challenge with PCB remediation is to balance the nutritional requirements and metabolism of the fungi on the support matrix, while assuring the survival of the fungus in the soil environment.

Anaerobic Biodegradation/Reductive Dechlorination. In contrast to aerobic biodegradation which destroys PCBs via ring cleavage, microbially catalyzed reductive dechlorination simply removes chlorine substituents from the more highly chlorinated congeners. By shifting the congener distribution to less chlorinated analogs, the overall toxicity of the mixture is typically reduced and the mixture becomes more susceptible to aerobic degradation. In general, reductive dechlorination preferentially removes chlorines from the meta and para positions and replaces them with hydrogen atoms, resulting in substantial reductions in carcinogenicity and "dioxin-like" toxicity. In addition to lowering the overall toxicity of PCB contaminated materials, the tendency of the PCB mixture to bioaccumulate is also Polychlorinated Biphenyl (PCB) Degradation Processes: State of Science reduced. For example, 2-chlorobiphenyl and 2,2-bichlorobiphenyl display an approximately 450-fold decrease in the tendency to bioaccumulate in fish compared with tri- and tetra-chlorinated PCBs. Most importantly, the resulting less chlorinated PCBs are susceptible to aerobic biodegradation process. Several approaches have been attempted to enhance the microbially catalyzed reductive dechlorination of PCBs. Researchers have attempted to stimulate dechlorination by amending microcosms with carbon substrates (e.g., fatty acids). Although in some cases this resulted in shortened lag times or increased initial rates of dechlorination, the overall extent of PCB dechlorination was not significantly increased. Others have attempted to stimulate dechlorination by adding individual polychlorinated or polybrominated congeners to microcosms. The process is designed to selectively enhance populations of organisms that can use the supplied congener as an electron acceptor. In one instance, this strategy reduced 79% of hexa- through nonachlorobiphenyls in sediments contaminated with Aroclor 1260; the resulting dechlorination products were predominately tri- to pentalchlorobiphenyls. This approach may not be applicable to in situ remediation efforts due to the potential regulatory resistance encountered at the prospect of adding polyhalogenated biphenyls to a contaminated site. The use of anaerobic biodegradation as a stand alone treatment for PCB contaminated sites would likely be hampered by regulatory treatment goals which are generally based on mass removal, not toxicity reduction. Although anaerobic dechlorination may provide greater toxicity reduction than aerobic PCB biodegradation, it is less likely to be used at a contaminated site because it does not produce the same level of PCB mass removal. The discrepancy in mass removals can be partially explained by the fact that a mass reduction of only 34.45 g is observed for each mole of chlorine atoms removed via reductive dechlorination, while a 257.5 g mass reduction is observed for each mole of trichlorbiphenyl destroyed aerobically. To optimize the reduction of both PCB toxicity and mass removal, researchers have begun investigating the utility of following anaerobic biodegradation with an aerobic biodegradation step.

Sequential anaerobic-aerobic biodegradation is a two step process in which PCB contaminated soils/sediments are first incubated anaerobically to reductively dechlorinate the more heavily chlorinated PCB congeners (i.e., congeners with more than 3 chlorine substituents). The anaerobic incubation is followed by an aerobic incubation intended to degrade the resulting mass of less-chlorinated congeners. In principle this should permit a significantly greater PCB mass removal, particularly of the more highly chlorinated Aroclor mixtures. One sequential study using soils contaminated with 1240 ppm of Aroclor 1248 demonstrated a 9% decrease in the PCB mass concentration after 12 weeks of anaerobic incubation, followed by an additional 72% decrease after aerobic incubation resulting in a total mass reduction of 81%. The same study showed that the aerobic treatment alone resulted in PCB mass removals as high as 80%, but more commonly aerobic reductions were around 72%. Although these numbers may cause one to question the utility of the anaerobic incubation, it is important to remember that only 1% of the congeners in Aroclor 1248 contain six or more chlorine atoms and that anaerobic dechlorination is more effective against the more highly chlorinated congeners. A second investigation examined the aerobic and the sequential anaerobic-aerobic treatment of weathered Aroclor 1248 in soil slurry microcosms. Microcosms had an initial Aroclor concentration of 100 ppm and an organic carbon content of 0.6%. Microcosms used in the sequential treatment process demonstrated dechlorination for the first 19 weeks of a 79-week anaerobic incubation. After week 79, the microcosms were amended with Pseudomonas sp. LB400, a known PCP degrading bacterium, and aerobically incubated for an additional 19 weeks. The sequential anaerobic-aerobic incubation produced Polychlorinated Biphenyl (PCB) Degradation Processes: State of Science a 70% reduction in PCB molar concentration; similarly, aerobically incubated microcosms exhibited a 67% decrease in PCB concentration. Again, the fact that the vast majority of congeners in Aroclor 1248 are susceptible to aerobic degradation skews data in favor of the aerobic incubation. Nonetheless, results did show that microcosms undergoing aerobic treatment alone contained a higher proportion of penta- and hexachlorobiphenyls.

To date, no system has been devised for the in-situ decomposition of PCBs in river bottoms. None of the above treatment methodologies would work in an aquatic environment. The present invention provides for such a system and effectively treats and decontaminates PCB containing soil in the bottoms of lakes, rivers, streams and oceans.

Various systems have been used to process solid waste and reduce the amount of solid waste present. Many systems use various heat sources such as flame or laser light to combust the solid waste. All these systems have been used in large and complex facilities, some of which also separate specific parts of the waste material into recyclable material. For example, rubber, steel, plastic, etc. all go into respective storage areas. Some representative patents are discussed below.

U.S. Pat. No. 4,759,300 to Hansen et al. discloses pyrolosis of waste products. Pyrolosis of waste, to achieve drying of waste, and then burning using laser ignition carried to self sustained burning due to methane generation.

U.S. Pat. No. 4,896,614 to Kalkarmi discloses hazardous waste treatment in the absence of oxygen. The resulting byproduct is then taken for separation into useful recyclable material.

U.S. Pat. No. 4,940,519 to Dames discloses a detoxification apparatus and method for toxic waste analysis using laser energy and electrolysis.

U.S. Pat. Nos. 4,960,380 & 5,127,347 to Cheetham disclose reducing solid waste material using coherent radiation. These patents use coherent radiation to reduce solid waste material (hazardous waste in this case) to ash or fly ash and then put it into a scrubber to remove any toxins.

U.S. Pat. No. 5,010,829 to Kulkarmi discloses hazardous waste treatment proposed by combusting in a plasma generator in the absence of oxygen and converts it into non-hazardous components.

U.S. Pat. No. 5,138,959 to Kulbami discloses the use of a plasma generator to combust solid and liquid hazardous waste material in the absence of oxygen. Subsequent separation is proposed to isolate non-hazardous gaseous waste products from the initial waste material. In a vacuum chamber of $10^{-1}$ Torr the process will be oxygen less.

U.S. Pat. No. 5,126,020 to Dames discloses a detoxification system using incinerators in a closed vessel and using lasers to create high temperatures within the material that incinerates or ionizes toxic waste. Disposal of PCBs, Dioxin and other primarily organic wastes is in a liquid form as a slurry which is sprayed into a chamber and then reacted upon by a system of lasers. It is claimed that the high temperature due to the laser beam interacting with the waste slurry will detoxify the organic waste, and then vapors are pumped out of the system and upon subsequent reaction in a vessel is then discharged to the atmosphere because it is now completely detoxified. The vapors are allowed to be pumped into the atmosphere and the remaining liquid waste is put into a second chamber and treated again with laser light. The problem with the above described process is that it is very complex and expensive, and may not be totally effective.

U.S. Pat. No. 5,648,592 to Pierce discloses a system for treating waste material by laser technology. A laser is used in a reaction chamber to heat waste products to a high temperature, but this is done in an atmosphere containing oxygen, thereby forming new bonds and silica ($SiO_2$) is added to form a solid mass containing the waste product. This system results in a solidified product, such as a pyroclastic material, to contain heavy metal waste in a crystal matrix. An electromagnetic radiation (coherent light) source is used to break down waste material to a molecular level.

The prior art has failed to address the problem of detoxification and decontamination of river bottoms. With the systems discussed above, the soil from the river bottom would have to be dredged up and transported to a central waste processing facility. This would be extremely costly, non-economic and cause a great deal of ecological damage. Invariably, as the soil is dredged up from the bottom, many of the contaminants would float downstream and pollute much more of the river.

It would be desirable to have a system that can be used to decontaminate river bottoms without greatly disturbing the bottom itself. This would result in hardly any contaminants being washed downstream and would have a minimal detrimental ecological impact on the river and river bottom. The present invention provides such a system, and could be used not just in river bottoms but also in ponds, streams, lakes or oceans.

SUMMARY OF THE INVENTION

In accordance with the present invention, a system and apparatus is provided for the decontamination of river bottoms. The system makes use of a barge, which is passed over the soil that needs to be decontaminated. The barge carries a high intensity laser, such as a 2,000 kW excimer YAG laser. The output of the laser is directed into a plurality of fiber optic cables. These fiber optic cables extend from the laser all the way down to the bottom of the river. The fiber optic cables direct the high intensity laser beams at the bottom of the river. The laser light reacts with the PCBs in the soil and breaks down and decontaminates the chemicals into harmless by-products. A UV light source can also be used simultaneously with the laser to help break the chemical bonds of the PCB molecules and facilitate decontamination.

BRIEF DESCRIPTION OF THE DRAWINGS

FIG. 1 is a chemical diagram of the structure of a PCB molecule.

FIG. 2 is a view of the barge and the fiber optic cables extending down to the bottom of the river.

FIG. 3 is a more detailed view of the fiber optic cables showing how the cables can adjust for varying depths.

FIG. 4 is a detail view of the end of the fiber optic cables.

DETAILED DESCRIPTION OF THE PREFERRED EMBODIMENT

FIG. 2 illustrates a partial view of the barge with the primary elements of the present invention. The barge 1 includes a barge control booth 2, diesel engine 3 and backup engine 12, and laser 4. Laser 4 is preferably a 2,000 kW Excimer YAG laser, but any type of laser having sufficient power to break down PCBs could be used. The barge carries a plurality of fiber optic cables 8 housed within a plurality of telescopic sleeves 6. These sleeves 6 allow the end of the fiber optic cables 8 to ride up and down, adjusting for the varying depth of the river bottom. This telescopic feature permits the end of the fiber optic cables 8 to always be very near the surface of the river bottom. A plurality of pull-up pulleys 5 are also present to help adjust the height of the fiber optic cables and sleeves. An adjustable sleeve support 11 maintains the fiber optic cables 8 in close spatial proximity to each other. Also mounted on sleeve 11, are lights 9 and video cameras 10. As the barge travels along the river, many obstacles can be encountered. Garbage, debris, sunken boats and/or vehicles can be encountered. By constantly monitoring the video camera, an operator can adjust the height of the fiber optic cables to avoid any entanglement or unwanted contact.

FIG. 3 shows a more detailed view of the telescoping sleeves and fiber optic cables. The barge can be very wide, so the fiber optic cables can span any desired width. Preferably, the fiber optic cable array can span any width from 50-300 feet. This allows any desired width of the river bottom to be treated. For wider rivers, the barge can navigate up and down, treating 300 feet wide swaths at a time, until the whole width of the river is treated and decontaminated. Each telescoping sleeve 6 is individually adjustable. As can be seen in FIG. 3, each sleeve 6 can be at a different height, so that the natural contours of the river bed can be followed.

FIG. 4 shows a very detailed view of the tip of the fiber optic cables 8. As can be seen, the fiber optic cables 8 extend out of the sleeves 6 and are arranged so that they are only a few inches from the surface of the river bottom. Laser light emitting from the fiber optic cables 8 strikes the river bed and the energy penetrates through a portion of the soil. The laser light breaks down the PCB molecules. The PCBs contained in the soil are broken down, on the molecular level, into their constituent parts. The resulting materials are harmless by-products. A horizontal and vertical ground sensor 7 is attached to the end of the telescopic sleeve. An ultra-violet (UV) light 13 is also attached to each telescopic sleeve. The sensor 7 enables the apparatus to automatically position the fiber optic cables at the optimum location. The sensor 7 is constantly monitored to effect automatic height adjustments to maintain the optimum distance between the surface of the river bottom and the end of the fiber optic cables. UV lights 13 can be used to help in the decontamination process. UV light, strongly peaked around 250 nm, can be used to decontaminate PCBs by causing HCL elimination and biphenyl bond rupture.

A method and apparatus has been described that decontaminates any PCB containing soil found at the bottom of any bottom of water. Ponds, rivers, lakes, or oceans can be treated with the present invention. High intensity laser light is used to break the chemical bonds in the PCB molecule. UV light can also be used to assist in this process. A further advantage to the present invention, is that the soil can be treated in situ. No soil needs to be dredged up and transported to another waste processing facility. The dredging process itself, would cause severe ecological damage as well as permitting a certain amount of PCB to wash downstream. By treating in-situ, no PCBs escape, and there is no detrimental impact to the aquatic environment. The result is a PCB free and totally decontaminated river bottom.

The present invention may be embodied in other specific forms without departing from the spirit or essential attributes thereof, and accordingly, reference should be made to the appended claims, rather than to the foregoing specification, as indicating the scope of the invention.

What is claimed is:

1. A method for decontaminating the soil at the bottom of a body of water, which is known to contain PCBs, comprising:

operating a system comprising a barge for carrying a high power laser, a plurality of fiber optic cables which extend from said barge down to near the bottom of the body of water, said laser mounted to emit high intensity laser light into said fiber optic cables so that said high intensity laser light will exit the fiber optic cables near the surface of the soil at the bottom of said body of water, said high intensity light functioning to break the chemical bonds of PCB molecules, a light source and video camera mounted on the fiber optic cables to enable an operator to view the present underwater operating environment, a ground sensor and UV light attached near the end of the fiber optic cables, said ground sensor allowing for the automatic adjustment of height and said UV light functioning to break down said PCBs;

wherein the method further comprises applying the high intensity laser light to soil at the bottom of the body of water, said laser light emitted from a plurality of fiber optic cables, which have their ends located near the bottom of the body of water, said laser light emitted at sufficient intensity and wavelength to break down the molecular structure of any PCB molecules located in soil, so that said soil is PCB free and decontaminated, and monitoring via said video camera and a ground sensing means, an underwater environment undergoing the treatment process, so that the height of the fiber optic cables may be individually adjusted to follow natural contours of the bottom of the body of water and to avoid contact with hazardous objects.

2. The method according to claim 1, where the body of water comprises a river.

3. The method according to claim 1, where the body of water comprises an ocean.

4. The method according to claim 1, where the body of water comprises a lake.

5. The method according to claim 1, where the body of water comprises a stream.

6. The method according to claim 1, where the body of water comprises a pond.

* * * * *